United States Patent [19]

List et al.

[11] Patent Number: 4,650,338
[45] Date of Patent: Mar. 17, 1987

[54] MIXING AND KNEADING MACHINE

[75] Inventors: Heinz List, Pratteln; Alfred Kunz, Witterswil, both of Switzerland

[73] Assignee: Dipl. Ing. H. List Industrielle Verfahrenstechnik, Pratteln, Switzerland

[21] Appl. No.: 677,833

[22] Filed: Dec. 4, 1984

[30] Foreign Application Priority Data

Dec. 5, 1983 [CH] Switzerland .......................... 6489/83
Jun. 15, 1984 [BR] Brazil .................................... 8402947

[51] Int. Cl.⁴ .............................................. B29B 1/10
[52] U.S. Cl. ......................................... 366/85; 366/97; 366/298; 366/307
[58] Field of Search ................... 366/83, 84, 85, 87, 366/88, 90, 97, 100, 298, 299, 307; 425/200, 201, 204, 209

[56] References Cited

U.S. PATENT DOCUMENTS

| | | | |
|---|---|---|---|
| 2,029,691 | 2/1936 | Robinson | 366/307 |
| 2,095,907 | 10/1937 | Beken | 366/298 |
| 3,689,035 | 9/1972 | Heinz | 366/85 |
| 3,873,070 | 3/1975 | Beken | 366/298 |
| 4,053,144 | 10/1977 | Ellwood | 366/298 |
| 4,304,054 | 12/1981 | Nauck | 366/90 |

Primary Examiner—Robert W. Jenkins
Attorney, Agent, or Firm—Bachman & LaPointe

[57] ABSTRACT

A mixing and kneading machine comprises a rotating shaft with four circumferentially juxtaposed kneading members, which have an angle of inclination bringing about an axial feed action. Another shaft rotates four times faster. The faster rotating shaft has kneading members with a four times greater slope than the kneading members on the slower shaft. A faster axial product feed in the casing part surrounding the more rapidly rotating shaft is prevented by baffle plates provided in said casing part, so that a narrower residence time distribution for the product is obtained.

14 Claims, 7 Drawing Figures

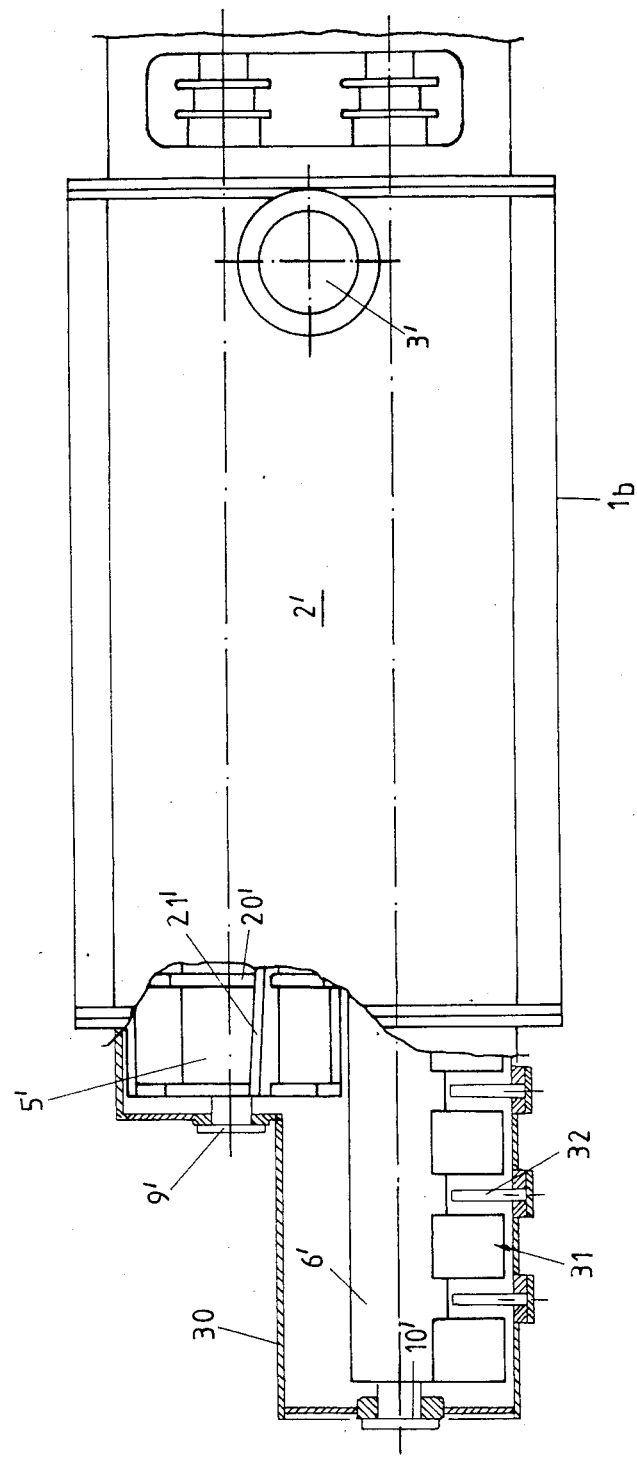

MIXING AND KNEADING MACHINE

BACKGROUND OF THE INVENTION

The invention relates to a mixing and kneading machine comprising an elongated casing having a material inlet and a material outlet, a first shaft and a second shaft rotatably mounted in said casing for rotational movement for moving a material from said inlet to said outlet, said first shaft and said second shaft being provided with means for rotating said first shaft at a faster speed than said second shaft. Kneading members are provided on the shafts and engage one another in toothed wheel-like manner and have an angle of inclination bringing about an axial feed and at least the kneading members of the more rapidly driven shaft are spacedly juxtaposed in the longitudinal direction of the shaft.

A machine of this type is, for example, known from Swiss Pat. No. 506,322. The kneading members of the second shaft therein have the function of cleaning the main shaft and its disk-shaped kneading members because, particularly when performing thermal reactions in the machines, the product tends to adhere to the surfaces. In order to bring about an improved mixing and kneading action, it is advantageous for both shafts to be driven at different speeds, so that there is a greater product movement in one part of the machine and a product exchange with the other part of the machine. However, as the kneading arms have an angle of inclination in the case of continuous product passage bring about a faster product feed in that part of the machine enclosing the more rapidly driven shaft, there is a non-uniform residence time distribution of the product within the machine.

The kneading members of this known machine have kneading arms extending parallel to the casing wall and in the longitudinal direction of the casing, so that they have a roughly bow-shaped configuration. Particularly when treating pasty or doughy product, it is frequently the case that the product also adheres to the kneading arms and moves therewith, without undergoing further mixing or kneading. Product already adhering to the arms causes further product to adhere thereto, so that the product closes the kneading member space enclosed by the bow shape.

SUMMARY OF THE INVENTION

The problem of the present invention is to provide a machine of the aforementioned type, which has an improved mixing and kneading action and more particularly makes the residence time of the product in the machine much more uniform, while bringing about a much greater self-cleaning of its surfaces coming into contact with the product.

This problem is solved by a machine comprising an elongated casing having a material inlet and a material outlet, a first shaft and a second shaft rotatably mounted in said casing for rotational movement for moving a material from said inlet to said outlet, said first shaft and said second shaft being provided with means for rotating said first shaft at a faster speed than said second shaft, kneading members mounted on said shafts such that said kneading members engage one another in toothed wheel-like manner wherein at least the kneading members mounted on said first shaft are spaced juxtaposed in the longitudinal direction of the shaft, a baffle plate fixed to the casing proximate to said first shaft, said baffle plate being directed in a plane perpendicular to the first shaft between the kneading members juxtaposed in the longitudinal direction of said first shaft.

As a result of the baffle plates to be provided according to the invention an excessively fast product feeding in the longitudinal direction of the machine is prevented, so that the product is increasingly fed in the transverse direction from the kneading members of one shaft to the kneading members of the other shaft. The resulting greater mixing and kneading action throughout the machine consequently leads to a narrower residence time distribution of the product within the machine and consequently to an improved product quality.

As a function of the intensity of the desired baffle or damming effect, the size of the baffle plates can be made such that they extend around the more rapidly rotating shaft at an angle of more than 90°. One baffle plate is in each case placed in one gap between the kneading members. Instead of one baffle plate extending the circumferential direction of the casing, it is also possible to circumferentially juxtapose several shorter plate portions. However, an interrupted baffle plate has the advantage of having less surfaces not cleaned by the kneading members moving past. In per se known manner, the kneading members of the more slowly rotating shaft can have heated disks, which are grazed in cleaning manner by the kneading members of the more rapidly rotating shaft.

In most cases, preference is given to the arrangement of the baffle plate or plates above the casing base. Assembly to the casing cover can also prove advantageous during the manufacture and maintenance of the machine.

The involute surfaces of the kneading members of the more rapidly rotating shaft are cleaned by the kneading arms of the more slowly rotating shaft as a result of their shape, because the latter move along said surfaces. In order to counteract the more pronounced conveying action of the closed, involute surfaces of the kneading members, advantageously at least one baffle plate can be arranged between said kneading members.

An accelerated product discharge can be prevented in a separate discharge-side casing, in which the kneading members do not have an angle of inclination which aids the feeding or conveying action. It is also possible to decelerate product feeding in said discharge side casing by means of baffle members, e.g. in the form of plates, which are located therebetween the kneading members. These baffle members also prevent the joint rotation of the product with the kneading members.

BRIEF DESCRIPTION OF THE DRAWINGS

The invention is described in greater detail hereinafter relative to non-limitative embodiments and the attached drawings, wherein show:

FIG. 5 is a plan view of a second embodiment of the machine with a broken away flange cover in the vicinity of the discharge end.

DETAILED DESCRIPTION OF THE PREFERRED EMBODIMENTS

Figure 1:
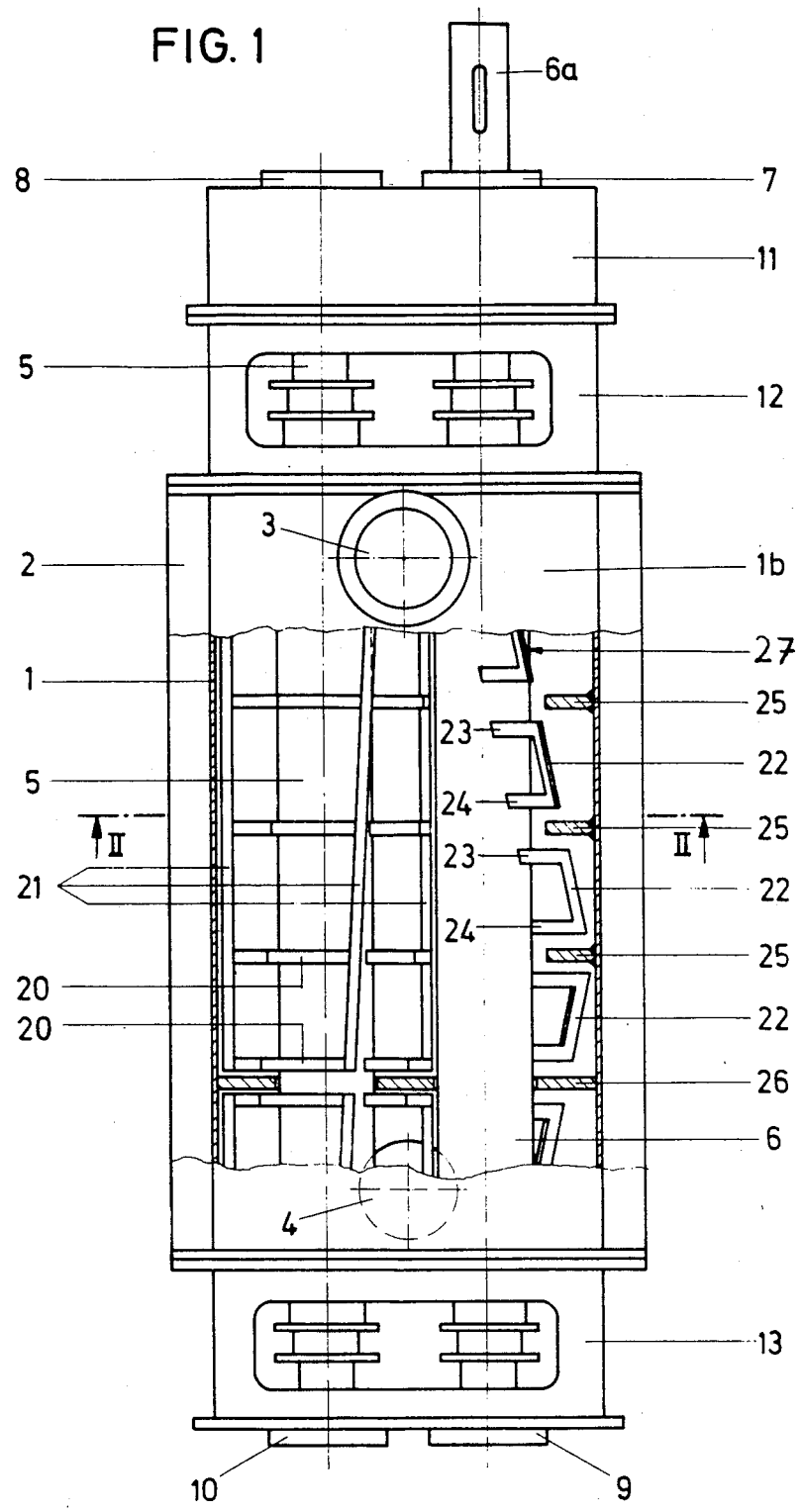
FIG. 1 is a plan view of the two-shaft machine with a partly broken away upper part, in order to render visible the shafts with the kneading members.

The machine has a working casing 1 with two casing parts 1a, 1b, in the form of parallel circular cylinders which pass into one another, so that the cross-section of casing 1 is in the form of a horizontal figure of eight. The upper part of casing 1 is closed by a removable flange cover 2 on which is provided an inlet connection 3. Cover flange 14 is tightly connected to flange 15 of casing base 16 by means of not shown clamping means, such as screws or clips. The flow through the machine takes place from the inlet connection 3 at one axial end of machine casing 1 to the outlet connection 4 provided at the other axial end in the casing base.

A more slowly rotating shaft 5 and a more rapidly rotating shaft 6 are mounted on two casing sides in bearings 7, 8 or 9, 10. On the drive side, the bearings are located in a gear 11, which is flanged to the end face of the machine by means of a connecting casing 12 (spacer) and interconnects the two shafts 5, 6 with a desired speed ratio. On the casing outlet side, the bearings are arranged in a flanged casing part 13 (spacer).

Driving takes place from the drive journal 6a, which is located on the more rapidly rotating shaft 6 and which, by means of a not shown pair of toothed wheels of gear 11, drives the more slowly jointly rotating shaft 5, in the present case with a speed ratio of 4:1.

On the periphery of the more slowly rotating shaft 5, there are four uniformly circumferentially spaced kneading members (FIG. 2) with a plurality of axially juxtaposed circular sector-shaped disks 20, which are interconnected by means of a kneading arm 21 directed with a limited slope parallel to the casing wall (FIG. 1). In each case, the disk elements are in a plane perpendicular to shaft 5 and are preferably heated in the same way as casing 1. In order to simplify the representation, the heating ducts for a heating medium are not shown, but it is obvious that in this case shaft 5 is hollow and that casing 1 together with the subsequently described baffle plates 25 is constructed in a double-walled manner.

Unlike in the case of the more slowly rotating shaft 5, the more rapidly rotating shaft 6, also called a cleaning shaft, has a plurality of axially juxtaposed kneading members 27, so that disks 20 of the more slowly rotating shaft 5 can move through a gap between the kneading members 27, if the kneading arms 21 of the more slowly rotating shaft 5 reciprocally engage in toothed wheel-like meshing manner with the kneading members 27 of the more rapidly rotating shaft.

The kneading arms 21 of the more slowly rotating shaft 5 and kneading members 27 of the more rapidly rotating shaft 6 have a slope, as can be gathered from FIG. 1. This also applies to the embodiment of the kneading members 27 according to FIG. 4, although there a corresponding perspective view has not been provided for ease of viewing reasons. They run parallel to the casing wall, so that on rotating the shaft, in much the same way as a helix or screw conveyor bring about a feeding or conveying action in the longitudinal direction thereof, i.e. in the case of corresponding rotation in the direction towards the outlet connection 4. If the kneading members 27 of one shaft are to meshingly move past the kneading arms 21 of the other shaft, then the more rapidly moving members 27, whereof only one is shown in the circumferential direction of the shaft, must have a correspondingly larger angle of inclination of their helical configuration. In the present case, the speed ratio is 4:1, so that the angle of inclination is four times greater. Although, viewed in the circumferential direction of the shaft, there is only one kneading member on the more rapidly rotating shaft, as opposed to four kneading members on the more slowly rotating shaft 5, this four times greater angle of inclination, linked with the four times greater rotary speed, brings about a much greater product feed in casing part 1b than in casing part 1a, if one or more baffle plates 25 are not provided in the casing part 1b surrounding the more rapidly rotating shaft 6. This faster feeding effect leads to part of the product passing more rapidly to the outlet connection 4, i.e., the residence time correspondingly differs.

In the represented embodiment, a plurality of baffle plates 25 are juxtaposed in the longitudinal direction of the casing in areas, which are not swept over by kneading members 27. However, in the case of the embodiment of FIG. 4, it is e.g. sufficient to have one baffle plate arranged roughly in the center of the machine. The baffle plates 25 extend in a plane perpendicular to shaft 6 and in the circumferential direction of the casing by an adequate angle of approximately 90°, so that a correspondingly large damming or baffle effect is obtained. The baffle plates are directed concentrically to the circumference of shaft 6, although this is not necessary. A gap 17 between the shaft circumference and the inner edge of baffle plates 25 permits an axial product feed, even in the vicinity of the baffle plates. The kneading members 27 graze along the baffle plate 25 and clean the same, while the kneading members 21, 27 running parallel to the casing wall clean the latter, so that encrustations are destroyed or prevented.

Figure 2:
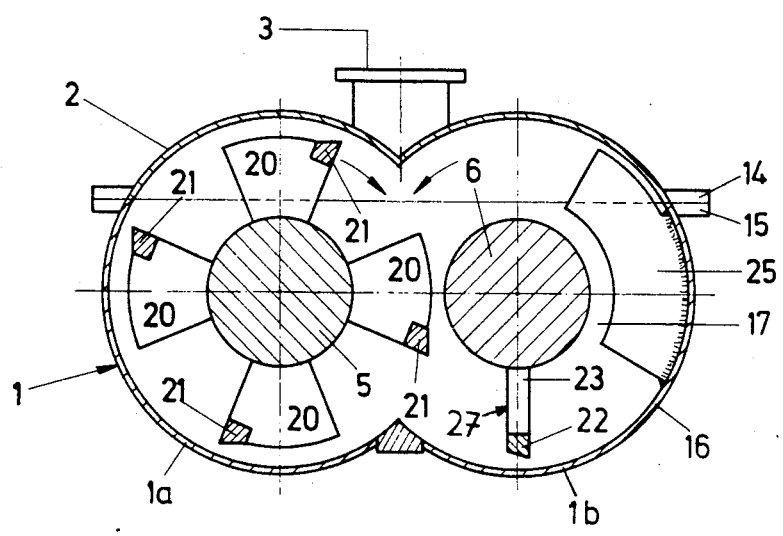
FIG. 2 is a vertical cross-section along line II—II of FIG. 1 corresponding to an embodiment with baffle plates fixed to the casing base.
Figure 3:
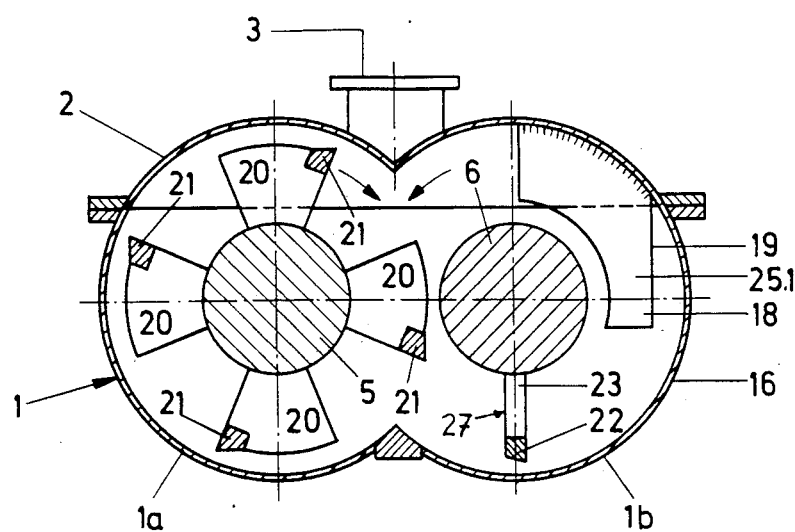
FIG. 3 is a view corresponding to FIG. 2 with baffle plates fixed to the casing cover.

The embodiment according to FIGS. 3 and 4 differs from that according to FIG. 2 in that the baffle plates 25.1 are fixed to casing cover 2. In addition, according to these embodiments, only the part of baffle plate 25.1 fixed to the casing cover is arcuate, whereas the baffle plate part 18 projecting into the lower casing part has a vertically directed outer boundary edge 19. This configuration makes it possible for the baffle plates 25.1 to be introduced into the lower casing part 16, during the vertical lowering of cover 2.

It is common to the embodiment of FIGS. 2, 3 and 4 that the baffle plates 25 or 25.1 are arranged on the side of shaft 6 remote from the more slowly rotating shaft 5 and above the casing base.

The embodiments of FIGS. 2 and 3 differ from that of FIG. 4 with regards to the construction of kneading members 27. Kneading members 27 according to FIGS. 2 and 3 have in each case two kneading beams 23, 24 directed radially away from the shaft and which are interconnected at their outer ends by a kneading arm sloping parallel to the casing wall. Thus, the kneading members of the more rapidly rotating shaft have a frame-like configuration, whereas those according to FIG. 4 are closed.

The filling level in the machine can be determined by an overflow plate 26 arranged in the casing base in front of the outlet connection 4. The overflow plate extends at right angles over the casing base and without interruption between the two casing parts 1a, 1b, as shown in FIG. 1. However, the filling level can also be regulated by an outlet valve provided on connection 14.

The embodiment of a machine according to the invention as shown in FIG. 5 has at its outlet end an outlet casing 30, which surrounds an extension of the more rapidly rotating shaft 6' and consequently forms an outlet side casing extension compared with the embodiment of FIG. 1. The kneading members 31 provided on the more rapidly rotating shaft 6' in said outlet casing 30 are constructed in radial cross-section in corresponding manner to the kneading members shown in FIGS. 4a to 4c, but do not slope. In addition, a baffle member 32 is arranged between them in each case. The lack of any slope, together with the baffle members 32 jointly lead to a deceleration of the product treated in the machine, linked with a greater thorough mixing in said outlet casing 30. This deceleration is advantageous, because the relatively rapidly rotating kneading members of the rapidly rotating shaft 6' bring about a strong axial feed in the vicinity of casing part 1b and which would otherwise lead to an excessively fast product discharge. This strong feed action particularly also results from the closed shape of the kneading members 27 according to FIG. 4 or the front face 33 of kneading member 27 extending uninterruptedly outwards from the shaft periphery (FIG. 4c). The kneading members 27 according to FIGS. 4 or 31 according to FIG. 5 brush with their lateral faces 35, 36 against the baffle plates 25, 25.1 or 32 and clean them, in the same way as the outer faces 37 of kneading members 27 according to FIGS. 4 and 5 running parallel to the casing wall clean the corresponding casing wall, so that encrustations are destroyed or prevented.

Advantageously, the front face 33 and the following face 34 of the kneading members 27 according to FIG. 4 have an involute configuration, so that the more slowly rotating kneading arms 21 of the kneading members of the more slowly rotating shaft 5 move in equidistantly spaced manner along said faces 33 and 34. This involute shape of the closed faces 33, 34 of kneading members 27 consequently leads to said faces being uniformly cleaned by kneading arms 21 and adherence of any product thereto is prevented. It is adequate for this purpose for kneading arm 21 to move in contact-free manner along said faces 33, 34.

Figure 4A:
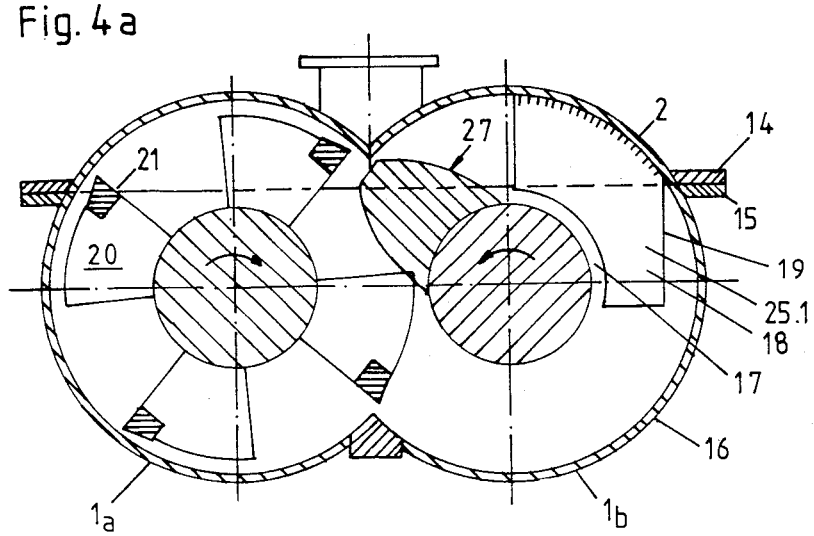
FIGS. 4a to 4c are vertical cross-sections through a further embodiment similar to FIG. 3 in three different rotation positions.
Figure 4B:
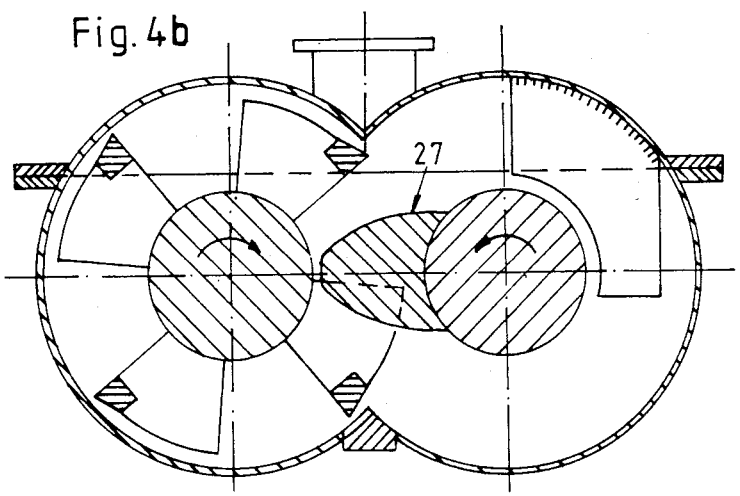
Figure 4C:
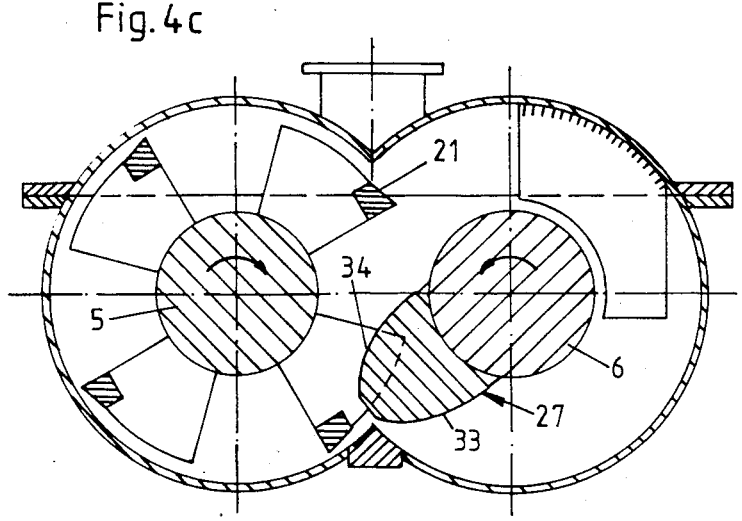

In FIGS. 4a to 4c, shafts 5, 6 and kneading members 22 are solid, but it is obvious that they could also be constructed as hollow bodies for the circulation of a heating medium.

As a result of its relatively large free volume within the casing, the machine is suitable both for the processing of pasty and free flowing products. Due to the geometrical configuration and kinematics, adhesion of product to the surfaces of the machine is largely prevented.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A mixing and kneading machine comprising: an elongated casing having a material inlet and a material outlet; a first shaft and a second shaft rotatably mounted in said casing for rotational movement for moving a material from said inlet to said outlet, said first shaft and said second shaft being provided with means for rotating said first shaft at a faster speed than said second shaft; kneading members mounted on said shafts wherein at least the kneading members mounted on said first shaft are spaced juxtaposed in the longitudinal direction of the shaft, said kneading members on at least said first shaft comprise two kneading beams and one kneading arm interconnecting the same; and a baffle plate fixed to the casing proximate to said first shaft, said baffle plate being directed in a plane perpendicular to the first shaft between the kneading members juxtaposed in the longitudinal direction of said first shaft.

2. A machine according to claim 1 wherein the baffle plate spacedly surrounds the first shaft circumference in an angular range of at least approximately 90°.

3. A machine according to claim 1 wherein at least part of the baffle plate is arcuate.

4. A machine according to claim 1 wherein the baffle plate is arranged above the casing base.

5. A machine according to claim 1 wherein the baffle plate is arranged on the side of the first shaft remote from the second shaft.

6. A machine according to claim 1 wherein plates are fixed to a casing cover provided on the top of the case.

7. A machine according to claim 1 wherein the kneading members on the second shaft are juxtaposed in the longitudinal direction of the second shaft and in a plane perpendicular to the second shaft, disks are provided, to whose outer circumference is fixed a kneading arm.

8. A machine according to claim 7 wherein each kneading member on the second shaft has at least three disks and a kneading arm interconnecting said disks.

9. A machine according to claim 1 wherein the speed ratio between the two shafts is the same as the ratio between the number of kneading members circumferentially juxtaposed on the shafts.

10. A machine according to claim 9 wherein the second shaft has four circumferentially juxtaposed kneading members and the first shaft a single kneading member, so that the speed ratio between the two shafts is 1:4.

11. A machine according to claim 1 wherein the kneading members of the first shaft have a front face and a back face, which uninterruptedly extend outwards with an involute curvature from the shaft circumference so that the kneading arms of the second shaft with a uniform spacing move in a cleaning manner along the faces.

12. A machine according to claim 1 wherein the casing part surrounding the first shaft is extended to an outlet casing surrounding an extension of the first shaft.

13. A machine according to claim 12 wherein kneading members of the first shaft surrounded by the outlet casing do not have any slope causing feeding in the outlet direction.

14. A machine according to claim 13 wherein baffle members are provided between the kneading members in the outlet casing.

* * * * *